(No Model.)
E. E. GLOVER.
BRAKE.
No. 282,452.  Patented July 31, 1883.
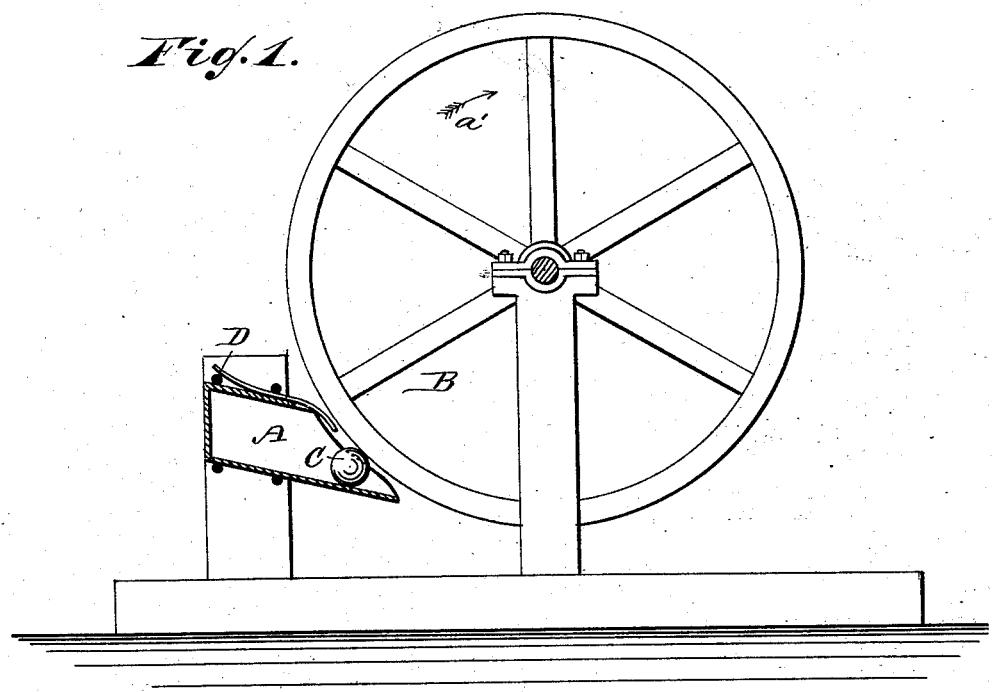
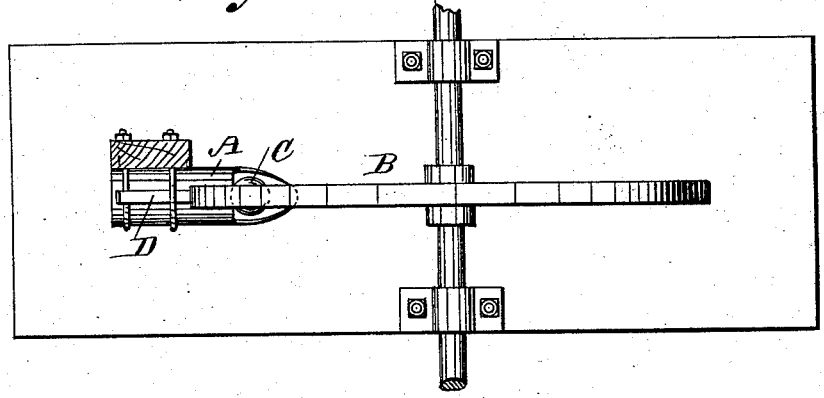
WITNESSES:
INVENTOR:
E. E. Glover
BY Munn & Co
ATTORNEYS.

UNITED STATES PATENT OFFICE.

ELMER E. GLOVER, OF TERRE HAUTE, INDIANA.

BRAKE.

SPECIFICATION forming part of Letters Patent No. 282,452, dated July 31, 1883.

Application filed June 4, 1883. (No model.)

*To all whom it may concern:*

Be it known that I, ELMER E. GLOVER, of Terre Haute, county of Vigo, Indiana, have invented a new and Improved Brake, of which the following is a full, clear, and exact description.

The invention relates to an improvement in brakes; and it consists of the combination and arrangement of parts, substantially as hereinafter fully set forth and claimed.

Reference is to be made to the accompanying drawings, forming part of this specification, in which similar letters of reference indicate corresponding parts in both figures.

Figure 1 is a longitudinal elevation of a wheel provided with my improved brake, which is shown in longitudinal section; and Fig. 2 is a plan view of the wheel and brake.

A box, A, is slightly inclined toward the rim of the wheel B, and the open end of the box is curved about the same as the rim of the wheel. A ball, C, resting on the bottom of the box A, rests against the rim of the wheel, and if the wheel is revolved in the direction of the arrow $a'$ the ball C will not bind; but if the wheel B is revolved in the reverse direction of the arrow $a'$ the ball C will be jammed in between the rim of the wheel and the bottom of the box A, and will thus lock the wheel and prevent the same from rotating—that is, the ball acts as a brake as soon as the wheel is revolved in the reverse direction of the arrow $a'$. If the brake is not to be used, the ball can be held back from the rim of the wheel by means of a spring-bar, D, which is held between the top of the box and a cross-pin; or the spring-bar can be held in place in any other suitable manner. If the brake is to operate again, the spring-bar is pushed upward. In place of the ball a small roller can be used; but the ball is preferred.

The above-described brake is to be applied on all classes of wheels, pulleys, shafting, &c.

Having thus described my invention, I claim as new and desire to secure by Letters Patent—

In a brake, the combination, with the box A, having the ball C resting against the rim of the wheel, of the spring-bar D, adjusted upon the box containing the bar, and adapted to be moved downward to intercept the impingement of the ball on the rim of the wheel, essentially as shown and described.

ELMER E. GLOVER.

Witnesses:
OLIVER G. GLOVER,
JOSHUA E. GLOVER.